United States Patent
Khalid

(10) Patent No.: US 9,630,706 B2
(45) Date of Patent: Apr. 25, 2017

(54) POSITIONABLE EJECTOR MEMBER FOR EJECTOR ENHANCED BOUNDARY LAYER ALLEVIATION

(71) Applicant: Rolls-Royce Corporation, Indianapolis, IN (US)

(72) Inventor: Syed J. Khalid, Palm Beach Gardens, FL (US)

(73) Assignee: Rolls-Royce Corporation, Indianapolis, IN (US)

(*) Notice: Subject to any disclaimer, the term of this patent is extended or adjusted under 35 U.S.C. 154(b) by 512 days.

(21) Appl. No.: 14/180,032

(22) Filed: Feb. 13, 2014

(65) Prior Publication Data

US 2016/0009377 A1    Jan. 14, 2016

Related U.S. Application Data

(60) Provisional application No. 61/767,959, filed on Feb. 22, 2013.

(51) Int. Cl.
*B64C 21/08* (2006.01)
*B64C 21/04* (2006.01)

(52) U.S. Cl.
CPC ............ *B64C 21/08* (2013.01); *B64C 21/04* (2013.01); *B64C 2230/06* (2013.01); *Y02T 50/166* (2013.01)

(58) Field of Classification Search
CPC ......... B64C 9/38; B64C 21/025; B64C 21/04; B64C 21/08; B64C 23/00; B64C 2230/06
See application file for complete search history.

(56) References Cited

U.S. PATENT DOCUMENTS

| | | |
|---|---|---|
| 2,659,552 A | 11/1953 | Stalker |
| 2,809,793 A * | 10/1957 | Warner ................... B64C 9/146 244/208 |
| 2,972,860 A | 2/1961 | Moy |
| 3,317,162 A | 5/1967 | Grant |
| 3,409,228 A | 11/1968 | Mehr |
| 3,432,100 A | 3/1969 | Hardy et al. |
| 3,516,511 A | 6/1970 | Urquhart |
| 3,572,960 A | 3/1971 | McBride |
| 3,591,085 A | 7/1971 | Medawar et al. |

(Continued)

FOREIGN PATENT DOCUMENTS

WO    2012018615 A1    2/2012

OTHER PUBLICATIONS

Extended European Search Report, European Application No. 11815067.1-1754 / 2598737 PCT/US2011/045345, dated Jul. 13, 2016, 9 pages.

(Continued)

*Primary Examiner* — Justin Rephann
(74) *Attorney, Agent, or Firm* — Barnes & Thornburg, LLP

(57) ABSTRACT

An aircraft having a moveable ejector member for assisting in alleviating a boundary layer flowing along an aircraft surface is disclosed. The moveable ejector member is capable of being placed at a variety of positions between a fully open position and a nested position to entrain the boundary layer with another fluid flow. The ejector member can take the form of an ejector shroud used with a nacelle. In some forms, a gas turbine engine is used to provide an ejector flow to entrain the boundary layer through the flow path.

12 Claims, 2 Drawing Sheets

(56) References Cited

U.S. PATENT DOCUMENTS

| | | | |
|---|---|---|---|
| 3,591,087 A | 7/1971 | Tontini | |
| 3,710,890 A | 1/1973 | True et al. | |
| 3,807,663 A * | 4/1974 | Bartoe, Jr. | B64C 3/14 244/207 |
| 4,018,046 A | 4/1977 | Hurley | |
| 4,043,121 A | 8/1977 | Thomas et al. | |
| 4,052,847 A | 10/1977 | Rodgers et al. | |
| 4,175,384 A | 11/1979 | Faust et al. | |
| 4,193,262 A | 3/1980 | Snell | |
| 4,196,585 A * | 4/1980 | Svischev | F02K 1/36 239/127.3 |
| 4,295,332 A | 10/1981 | Steyer et al. | |
| 4,466,587 A | 8/1984 | Dusa et al. | |
| 4,493,184 A | 1/1985 | Nikkanen et al. | |
| 4,674,716 A * | 6/1987 | Moore | B64C 3/50 244/207 |
| 4,848,701 A * | 7/1989 | Belloso | B64C 9/146 244/12.5 |
| 4,976,349 A * | 12/1990 | Adkins | B64C 9/38 244/198 |
| 5,136,837 A | 8/1992 | Davidson | |
| 5,137,230 A | 8/1992 | Coffinberry | |
| 5,216,879 A * | 6/1993 | Zysmaan | B64D 33/06 244/54 |
| 5,263,667 A | 11/1993 | Horstman | |
| 5,284,012 A | 2/1994 | Laborie et al. | |
| 5,435,127 A | 7/1995 | Luffy et al. | |
| 5,586,431 A | 12/1996 | Thonebe et al. | |
| 5,746,047 A | 5/1998 | Steyer et al. | |
| 5,782,077 A | 7/1998 | Porte | |
| 5,884,873 A | 3/1999 | Breit | |
| 5,941,065 A | 8/1999 | Lidstone et al. | |
| 6,094,907 A | 8/2000 | Blackner | |
| 6,216,982 B1 | 4/2001 | Pfennig et al. | |
| 6,295,805 B1 | 10/2001 | Lackey et al. | |
| 6,301,877 B1 | 10/2001 | Liang et al. | |
| 6,424,805 B2 | 7/2002 | Ohsawa | |
| 6,983,602 B2 | 1/2006 | Senile | |
| 6,988,674 B2 | 1/2006 | Steyer et al. | |
| 7,048,230 B2 | 5/2006 | Meyer | |
| 7,200,999 B2 | 4/2007 | Bagnall et al. | |
| 7,364,117 B2 | 4/2008 | Dionne | |
| 7,607,305 B2 | 10/2009 | Steyer et al. | |
| 7,607,306 B2 | 10/2009 | Steyer et al. | |
| 7,770,381 B2 | 8/2010 | Johnson et al. | |
| 7,823,838 B1 * | 11/2010 | De ning | B64C 9/38 244/12.5 |
| 7,837,155 B2 * | 11/2010 | Meister | B64C 21/06 244/209 |
| 2002/0092948 A1 | 7/2002 | Dugan | |
| 2004/0089764 A1 | 5/2004 | McClure | |
| 2005/0081530 A1 | 4/2005 | Bagnall et al. | |
| 2005/0151026 A1 | 7/2005 | Meyer | |
| 2007/0245711 A1 | 10/2007 | Stretton | |
| 2008/0014078 A1 | 1/2008 | Suciu et al. | |
| 2008/0296439 A1 | 12/2008 | Cloft et al. | |
| 2009/0155046 A1 | 6/2009 | Haas | |
| 2009/0165995 A1 | 7/2009 | Bajusz et al. | |
| 2009/0217643 A1 | 9/2009 | Sokhey et al. | |
| 2009/0314004 A1 | 12/2009 | Van der Woude | |
| 2010/0162679 A1 | 7/2010 | Khalid | |
| 2010/0162680 A1 | 7/2010 | Khalid | |
| 2011/0277483 A1 | 11/2011 | Khalid | |

OTHER PUBLICATIONS

Canadian Office Action issued in connection with Canadian Application No. 2,689,176, dated Jan. 18, 2016, 3 pages.

\* cited by examiner

POSITIONABLE EJECTOR MEMBER FOR EJECTOR ENHANCED BOUNDARY LAYER ALLEVIATION

CROSS REFERENCE TO RELATED APPLICATIONS

This application claims priority to and the benefit of U.S. Provisional Patent Application No. 61/767,959, filed 22 Feb. 2013, the disclosure of which is now expressly incorporated herein by reference.

TECHNICAL FIELD

The present disclosure generally relates to boundary layer mitigation. More particularly, but not exclusively, the present disclosure generally relates to ejectors used with gas turbine engines for boundary layer mitigation.

BACKGROUND

Alleviating boundary layers formed on flow surfaces of aircraft remains an area of interest. Some existing systems have various shortcomings relative to certain applications. Accordingly, there remains a need for further contributions in this area of technology.

SUMMARY

One embodiment of the present disclosure is a unique aircraft ejector capable of being modulated. Other embodiments include apparatuses, systems, devices, hardware, methods, and combinations for changing an ejector flow path to a variety of positions. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
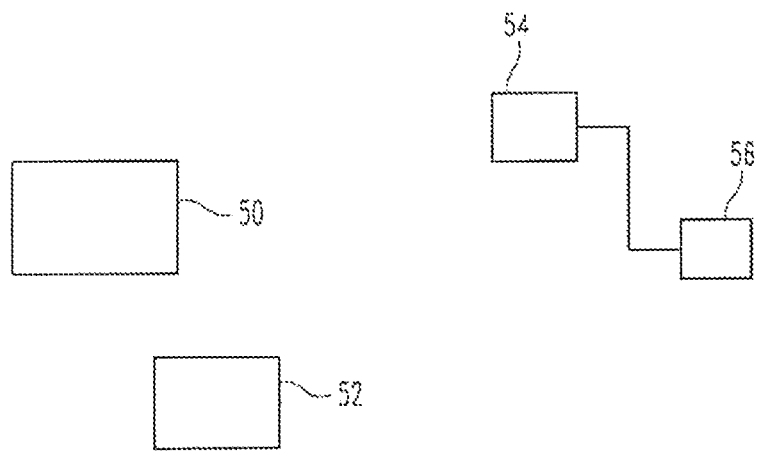
FIG. 1 depicts an embodiment of an aircraft and power plant.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, an aircraft 50 is shown having a power plant 52 used to provide propulsion. The aircraft 50 is also coupled with a sensor 54 and a controller 56 which together can be used to control one or more systems of the aircraft 50 as will be described further below. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present disclosures are contemplated for utilization in other applications that may not be coupled with an aircraft such as, for example, applications involving other vehicle types such as, but not limited to, naval propulsion.

Figure 2:
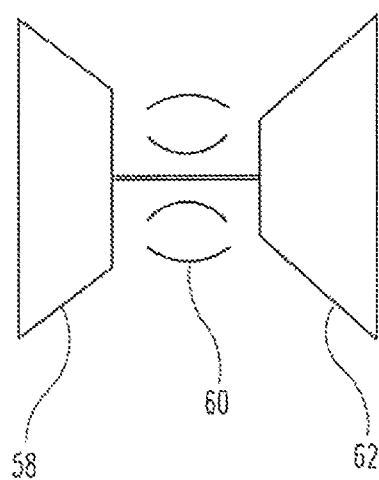
FIG. 2 depicts an embodiment of a gas turbine engine.

The power plant 52 can take a variety of forms including an internal combustion engine. In some embodiments the aircraft 50 can include multiple internal combustion engines used as power plants. In one non-limiting embodiment shown in FIG. 2, the power plant 52 takes the form of a gas turbine engine and is shown as a single spool turbojet having a compressor 58, a combustor 60, and a turbine 62. The gas turbine engine can take other forms in different embodiments including multi-spool engines, turboprops, turboshafts, and turbofans. The gas turbine engine can furthermore be an adaptive and/or variable cycle engine. In short, the gas turbine engine can take a variety of forms other than that depicted in FIG. 2.

As discussed above, the aircraft can include a control and sensor package suitable to regulate one or more systems. The sensor 54 can be used to assess any variety of conditions such as, but not limited to, aircraft and engine conditions. In one form, the sensor 54 measures aircraft flight condition, such as speed and altitude, to set forth just two non-limiting examples, and can output any variety of data whether sensed or calculated. The sensor 54 can also measure such things as shaft speed of the engine. To set forth just a few non-limiting uses, the sensor 54 can sense and output conditions such as static temperature, static pressure, total temperature, and/or total pressure, among possible others. In one non-limiting example, the sensor 54 can take the form of a boundary layer rake. The sensor 54 can output calculated values such as, but not limited to, equivalent airspeed, altitude, and Mach number. Any number of other sensed conditions or calculated values can also be output. The sensor 54 is structured to convey data to the controller 56 and can output values in either analog or digital form. In some forms, the sensor 54 can be embedded with the controller 56.

The controller 56 is provided to monitor and control engine and/or aircraft operations. The controller 56 can be comprised of digital circuitry, analog circuitry or a hybrid combination of both of these types. Also, the controller 56 can be programmable, an integrated state machine, or a hybrid combination thereof. The controller 56 can include one or more Arithmetic Logic Units (ALUs), Central Processing Units (CPUs), memories, limiters, conditioners, filters, format converters, or the like which are not shown to preserve clarity. In one form, the controller 56 is of a programmable variety that executes algorithms and processes data in accordance with operating logic that is defined by programming instructions (such as software or firmware). Alternatively or additionally, operating logic for the controller 56 can be at, least partially defined by hardwired logic or other hardware. In one particular form, the controller 56 is configured to operate as a Full Authority Digital Engine Control (FADEC); however, in other embodiments it may be organized/configured in a different manner as would occur to those skilled in the art. It should be appreciated that controller 56 can be exclusively dedicated to control of the power plant 52, or may further be used in the regulation/control/activation of one or more other subsystems or aspects of aircraft 50.

Figure 3:
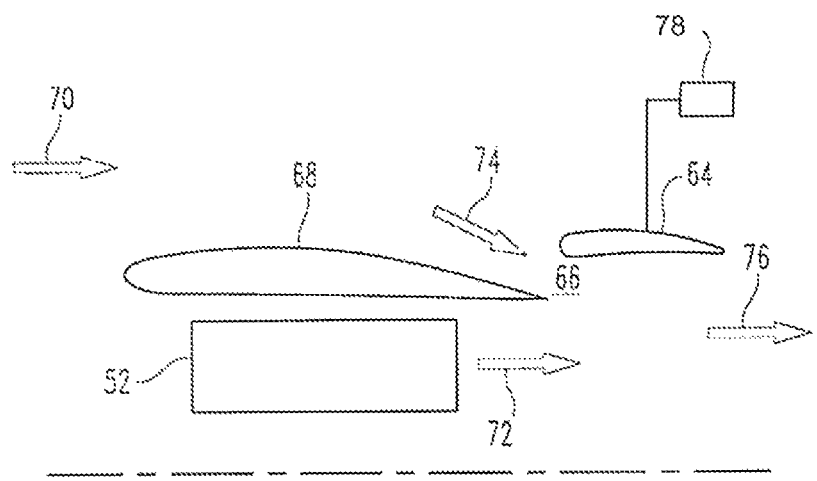
FIG. 3 depicts an embodiment of a moveable ejector member used with an aircraft flow surface.

FIG. 3 depicts a moveable ejector member 64 useful in opening and closing a flow path 66 formed between the member 64 and toward the downstream side of an external surface 68 that in some forms is used to enclose the power plant 52. In the illustrated embodiment, the power plant 52 is shown as a gas turbine engine, but other embodiments can include other types of power plants. The moveable ejector member 64 can be controlled as it is opened and closed using the sensor and control package described above. The moveable ejector member 64 takes the form of an axially extending member 64 between an upstream end and a downstream end. The member 64 can be a planar member, a faceted member, and in some forms can be an annular or semi-annular extending member. The member 64 can furthermore include an airfoil cross sectional shape. In some embodiments, the external surface 68 takes the form of a nacelle coupled with the aircraft 50 which can be used to surround the power plant 52. The ejector member 64 can take the form of an ejector shroud, one form of which is used to interact with a nacelle as the flow path 66 is moved between positions.

As shown in FIG. 3, a free stream 70 passes external to the aircraft 50 (shown in FIG. 1) and flows along the external surface 68. Some of the free stream is captured by the power plant 52 which is used in any number of manners to produce a flow stream 72. In one form, the flow stream 72 is an exhaust of the power plant, and, in another particular form, is an exhaust produced by a gas turbine engine whether the exhaust is entirely core related or also includes a fan stream flow or mixed flow. When the ejector member 64 is moved to an open position, a flow stream 74 can be captured via ejector action to flow through the flow path 66 and become entrained with the flow stream 72. When entrained, the flow stream 72 and flow stream 74 form a combined flow stream 76. In embodiments described below, the flow stream 74 can represent a boundary layer formed adjacent the external surface 68. The flow stream 74 can represent a portion of the boundary layer, the entirety of the boundary layer, or the entirety of the boundary layer plus an additional contribution of the free stream 70 outside of the boundary layer.

An actuation device 78 is coupled with the ejector member 64 and can be used in conjunction with the sensor and control package to effect a movement of the member 64 and capture the flow stream 74. Such a movement can be translational fore and aft. In some nonlimiting forms, the ejector member 64 can be rotated like a screw such that a portion of the member 64 is moved fore and aft. The actuation device 78 can move the member 64 to a variety of positions and, in some embodiments, can accomplish position control at a variety of rates. The variety of positions can range from a fully open position to a nested position that permits little to no flow to pass through flow path 66. Intermediate positions are also contemplated herein. The fully open position and the nested position can be mechanically determined and/or implemented in the controller 56.

The variety of positions available to the ejector member 64 can take the form of pre-set steps such as through, a mechanical ratchet mechanism, or any possible position within a range of position using a relatively more continuous mechanical interconnection among other possible arrangements. In other alternative or additional forms, the variety of positions available to the ejector member 64 is determined at least in part through digital control. The positions available can also be accomplished through analog control. Mechanical interplay, hysteresis, friction effects, free-play, digital to analog converters, analog to digital converters, etc. associated with any of the ejector member 64, actuation device 78 and/or integration with an actuator controller can determine the precision of the variety of positions. Accordingly, those of skill in the art will appreciate that no limitation is intended herein regarding the precision of the positions available to the ejector member 64, only that a variety of positions between, and, in some embodiments including, the fully open position and nested position are otherwise available.

The actuation device 78 can take a variety of forms and can be implemented in a variety of manners. To set forth just a few non-limiting examples, the actuation device 78 can be hydraulic, electric, or electromechanical systems, among potential others. In some forms, the actuation device 78 can be controlled via a feedback controller coupled with the device 78. For example, the actuation device 78 can be controlled by sensing a position of the device 78 and, controlling the position through an actuator controller. In some forms, the actuator controller can be integrated with the actuation device 78. In other forms, the actuator controller can alternatively be integrated with, or in communication with, the controller 56. In some forms the actuation device 78 can be open loop such that a command is operated upon, but a measured position of the device 78 is not utilized to tightly control the exact position.

Figure 4:
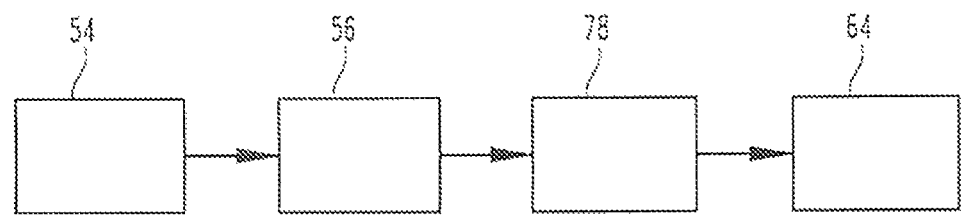
FIG. 4 depicts an embodiment of a sensor and controller used with an ejector member and actuation device.

FIG. 4 depicts one embodiment of a sensor and control package useful to changing a position of the ejector member 64 with the actuation device 78. The ejector member 64 can be placed at any number of positions between the nested position and fully open position by operation of the controller 56. As a condition is received and/or determined by the controller 56, a command is issued to the actuation device 78 to move the ejector member 64 to a position that alters the size of the flow path 66.

The controller 56 is configured to set the ejector member 64, and resultant flow path 66, which is derived from an assessed thickness of a boundary layer flowing along the external surface 68, where such assessment is through estimates, measurements, preprogrammed relationships, etc. Such a thickness can be a velocity thickness, a displacement thickness, or a momentum thickness. In some embodiments, the estimated thickness used by the controller 56 to set the ejector member 64 can be determined a function of condition, such as flight condition, engine condition, aircraft configuration, flight mode, etc. For example, the controller 56 can include a routine dependent upon a condition where the routine might, for example, include a table lookup as a function of Mach number and altitude. The condition can be any of a variety of variables and their combinations. For example, any one or combination of altitude, airspeed, angle of attack, Mach number, engine rotational speed, engine pressure, engine temperature, aircraft mode, aircraft configuration, take off mode, landing mode, and others can be used.

Depending on the condition that in some embodiments is assessed by the sensor 54, the table lookup can provide an estimate of the boundary layer thickness. This estimate can be used by the controller 56 to command the ejector member 64 to a position to capture the estimated boundary layer. In still other applications, a table lookup as a function of condition can provide a command value to be used by the actuation device 78 to control the ejector member 64. In some applications the sensor 54 can be a boundary layer rake from which a thickness of the boundary layer is measured and the actuation device 78 moved via the controller 56 to capture all or a portion of the boundary layer. In other embodiments, the controller 56 can control the ejector member 64 based upon a flight mode. For example, when entering a mode the controller 56 can command the ejector member 64 and keep the ejector member at that setting for the remainder of that particular mode. Upon entering another mode, the ejector member 64 can be commanded to a different position. In some embodiments, the controller 56 additionally and/or alternatively can control the ejector member 64 continuously during flight or a given flight mode. Any of the conditions described above, either alone or in combination, can be used.

In some forms, the controller 56 can determine a commanded position of the ejector member 64 in one time, and in another time determine another commanded position if the conditions have changed and/or is warranted otherwise. In analog systems, the times can be infinitesimally small. The time can be a period, such as a time frame of a digital system, can be during a mode such that the command is issued once during the mode. Furthermore, the update of the controller 56 to determine another commanded position can be selected by an operator such as a pilot of the aircraft. Still further, an operator can manually interact with the controller 56 to determine an appropriate position of the ejector member 64. Such manual interaction can include overriding a system command, supplementing a system command, or bypassing a system command.

One aspect of the present application provides an apparatus comprising an aircraft having a power plant useful to discharge a relatively high velocity fluid stream to provide a force useful in affecting a movement of the aircraft, the fluid stream being useful as a primary flow stream of an ejector, a flow surface over which a working fluid passes to form a boundary layer as the aircraft is in motion, an airflow member structured to be moveable relative to the flow surface between a relatively open position and a relatively closed position, the airflow member capable of producing a gap between a portion of the airflow member and the flow surface wherein the gap serves to capture at least a portion of the boundary layer from the flow surface and provide it as a secondary flow stream of the ejector, and a controller structured to operate upon a determined condition and actuate the airflow member to a variety of positions as a function of the determined condition to control the ejector, the variety of positions corresponding to respective gap distances appropriate to entrain the at least a portion of the boundary layer.

One feature of the present application provides wherein the flow surface comprises a nacelle of the power plant.

Another feature of the present application provides wherein the power plant is a gas turbine engine and the high velocity fluid stream is an exhaust of the gas turbine engine.

Still another feature of the present application provides wherein the airflow member comprises an ejector shroud, wherein the relatively closed position is a closed position, and wherein the controller is a digital controller.

A further feature of the present application provides wherein the aircraft includes a plurality of power plants each having respective airflow members and wherein the airflow member can be commanded to a series of discrete positions as result of the controller operating upon a series of determined conditions.

A still further feature of the present application provides wherein the controller is a plurality of controllers associated with each respective power plant.

Yet a still further feature of the present application provides wherein the determined condition includes one of a determined engine condition, flight condition, aircraft mode and aircraft configuration and wherein the airflow member is capable of dwelling at a plurality of positions until the determined flight condition changes.

Another aspect of the present application provides an apparatus comprising a gas turbine engine that includes a compressor, combustor, and turbine and a passage for flowing a working fluid produced during operation of the gas turbine engine, an aircraft flow surface structured to form a boundary for the passage of a gas, a boundary layer formed as the gas is passed along the aircraft flow surface, an ejector flow member in proximity to the aircraft flow surface and capable of being actuated to a plurality of positions to vary an ejector passage formed between the ejector flow member and the aircraft flow surface, the ejector passage oriented to capture the boundary layer formed on the aircraft flow surface, and a control module configured to command the ejector flow member to any of the plurality of positions to entrain a momentum thickness of the boundary layer with the working fluid produced during operation of the gas turbine engine that is flowed through the passage.

A feature of the present application provides wherein the passage is an exhaust and the working fluid is an exhaust gas, and which further includes an aircraft.

Another feature of the present application provides wherein the ejector flow member is an ejector shroud disposed at least partially around a nacelle of the gas turbine engine.

Yet another feature of the present application provides wherein the control module is configured to command an actuator useful to change a position of the ejector flow member.

Still another feature of the present application provides wherein the ejector flow member is operable to entrain an entirety of the boundary layer.

Yet still another feature of the present application provides wherein the control module is structured to modulate the ejector flow member as a function of one of engine condition and flight condition.

A further feature of the present application provides wherein the ejector flow member is an ejector shroud and wherein the control module updates a command of the ejector flow member.

Still another aspect of the present application provides feature of the present application provides an apparatus comprising an aircraft having a gas turbine engine operable to produce a flow stream and enclosed by a flow forming surface exposed to a free stream, the flow forming surface effective to generate a boundary layer when the aircraft is in motion, a sensor useful for determining an operating condition, and means for entraining the boundary layer with the flow stream as a function of the operating condition.

Yet a further aspect of the present application provides a method comprising operating a gas turbine engine to produce a relatively high velocity flow stream, propelling a vehicle having the gas turbine engine to produce an external flow stream along a flow surface, the movement of the vehicle producing a boundary layer, determining a condition useful to operate an ejector forming member, adjusting an ejector flow passage area based upon the determining between a minimum area position and a maximum area position, a position of the ejector forming member resolved from possible positions ranging between the minimum area position and maximum area position.

A feature of the present application provides wherein the adjusting includes moving an ejector flow passage member to a first position and which further includes moving the ejector flow passage member to a second position based upon re-determining the condition.

Another feature of the present application provides wherein the adjusting includes issuing a command to an actuation member.

Still another feature of the present application provides wherein the re-determining occurs repeatedly throughout at least a portion of a flight.

Yet still another feature of the present application provides wherein the determining includes calculating a flight condition based upon a sensed condition.

A further feature of the present application provides wherein the calculating occurs repeatedly throughout at least a portion of a flight.

While the invention has been illustrated and described in detail in the drawings and foregoing description, the same is to be considered as illustrative and not restrictive in character, it being understood that only the preferred embodiments have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," at least one or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
an aircraft having a power plant configured to discharge a fluid stream to provide a force that affects a movement of the aircraft, the fluid stream adapted for use as a primary flow stream of an ejector;
a flow surface over which a working fluid passes to form a boundary layer as the aircraft is in motion, the flow surface comprising a nacelle of the power plant;
an ejector having an ejector shroud structured to be moveable fore and aft relative to the flow surface between an open position and a closed position, the ejector shroud capable of producing a gap between a portion of the ejector shroud and the flow surface, wherein the gap serves to capture at least a portion of the boundary layer from the flow surface and provide it as a secondary flow stream of the ejector; and
a controller configured to operate upon a determined condition and actuate the ejector shroud to a variety of positions between the open position and the closed position as a function of the determined condition to control the ejector, and the determined condition includes one of a determined aircraft altitude, static temperature, static pressure, total temperature, total pressure, and aircraft configuration.

2. The apparatus of claim 1, wherein the power plant is a gas turbine engine and the fluid stream is an exhaust of the gas turbine engine.

3. The apparatus of claim 2, wherein the aircraft includes a plurality of power plants each having respective ejector shrouds and wherein the respective ejector shroud can be commanded to a series of discrete positions as result of the controller operating upon a series of determined conditions.

4. The apparatus of claim 3, wherein the controller is a plurality of controllers associated with each respective power plant.

5. The apparatus of claim 1, wherein the ejector shroud is configured to rotate to cause the ejector shroud to move fore and aft with respect to an axial direction of the power plant.

6. The apparatus of claim 1, further including a mechanical ratchet system configured to move the ejector shroud in pre-set steps between the open position and the closed position.

7. An apparatus comprising:
a gas turbine engine that includes a compressor, combustor, and turbine and a passage for flowing a working fluid produced during operation of the gas turbine engine;
an aircraft flow surface structured to form a boundary for the passage of a gas, a boundary layer formed as the gas is passed along the aircraft flow surface;
an ejector flow member in proximity to the aircraft flow surface and capable of being actuated to a plurality of positions to vary an ejector passage formed between the ejector flow member and the aircraft flow surface, the ejector passage oriented to capture the boundary layer formed on the aircraft flow surface, and the ejector flow member includes a rotatable ejector shroud; and
a control module including sensors, an actuator, and a controller, the sensors configured to asses a plurality of flight conditions of the gas turbine engine and determine a position of the ejector flow member relative to the aircraft flow surface, the actuator configured to rotate the rotatable ejector shroud to cause the ejector flow member to move axially forward and aft with respect to an axial direction of the gas turbine engine, and the controller configured to command the actuator to move the ejector flow member to any of the plurality of positions, based on outputs received from the sensor and the determined position of the ejector flow member relative to the aircraft flow surface, to entrain a momentum thickness of the boundary layer with the working fluid produced during operation of the gas turbine engine that is flowed through the passage.

8. The apparatus of claim 7, wherein the passage is an exhaust and the working fluid is an exhaust gas, and which further includes an aircraft.

9. The apparatus of claim 7, wherein the ejector flow member is operable to entrain an entirety of the boundary layer.

10. The apparatus of claim 7, wherein the control module is structured to modulate the ejector flow member as a function of one of engine condition and flight condition.

11. The apparatus of claim 7, wherein the variety of flight conditions include at least one of an aircraft altitude, shaft speed, static temperature, static pressure, total temperature, and total pressure.

12. The apparatus of claim 7, wherein the sensors include boundary layer rakes that extend into the working fluid.

* * * * *